(12) United States Patent
Stark

(10) Patent No.: US 9,650,070 B2
(45) Date of Patent: *May 16, 2017

(54) LAWN CARE VEHICLE WITH REAR WHEEL STEERING ASSEMBLY

(71) Applicant: Husqvarna AB, Huskvarna (SE)

(72) Inventor: Urban Stark, Vaggeryd (SE)

(73) Assignee: HUSQVARNA AB, Huskvarna (SE)

( * ) Notice: Subject to any disclaimer, the term of this patent is extended or adjusted under 35 U.S.C. 154(b) by 285 days.

This patent is subject to a terminal disclaimer.

(21) Appl. No.: 14/515,738

(22) Filed: Oct. 16, 2014

(65) Prior Publication Data

US 2015/0035244 A1  Feb. 5, 2015

Related U.S. Application Data

(63) Continuation of application No. 14/131,240, filed as application No. PCT/US2011/043616 on Jul. 12, 2011, now Pat. No. 8,888,130.

(51) Int. Cl.
*B62D 7/16* (2006.01)
*A01D 34/00* (2006.01)
(Continued)

(52) U.S. Cl.
CPC .......... *B62D 7/163* (2013.01); *A01D 34/006* (2013.01); *A01D 34/64* (2013.01); *A01D 34/66* (2013.01);
(Continued)

(58) Field of Classification Search
CPC .......... B62D 7/163; B62D 3/02; B62D 1/163; B62D 65/00; B62D 9/00; A01D 34/006;
(Continued)

(56) References Cited

U.S. PATENT DOCUMENTS 3,110,352 A   11/1963  McClarnon
3,669,466 A *  6/1972  Spence ................... B62D 3/02
                                              180/409
(Continued)

FOREIGN PATENT DOCUMENTS

CN       201091097 Y   7/2008
EP         0672575 A1   9/1995
GB         2039837 B    5/1983

*Primary Examiner* — Paul N Dickson
*Assistant Examiner* — Joselynn Y Sliteris
(74) *Attorney, Agent, or Firm* — Nelson Mullins Riley & Scarborough LLP

(57) ABSTRACT

A riding lawn care vehicle may include a frame and a steering assembly. Wheels of the riding lawn care vehicle may be attachable to the frame. The steering assembly may include a steering wheel operably coupled to rear wheels of the riding lawn care vehicle via a cable system. The cable system may include a first cable portion, a second cable portion and a pulley assembly. The first and second cable portions may each contact a steering column pulley at respective first ends of the first and second cable portions. The steering column pulley may be configured to pull a corresponding one of the first cable portion or the second cable portion based on a direction of rotation of the steering wheel. The first and second cable portions may each be in operable communication with a steering disc at respective second ends of the first and second cable portions. The steering disc may provide translation of movement of the first cable portion and the second cable portion into corresponding movement of the rear wheels. The pulley assembly may be configured such that each pulley of the pulley assembly handles both the first cable portion and the second cable portion as the first cable portion and the second cable portion are conveyed from the steering column pulley to the steering disc to translate motion of the steering column pulley to the steering disc.

20 Claims, 9 Drawing Sheets

(51) Int. Cl.
*F16C 1/00* (2006.01)
*A01D 34/66* (2006.01)
*A01D 34/82* (2006.01)
*A01D 34/64* (2006.01)
*B62D 9/00* (2006.01)
*B62D 65/00* (2006.01)
*F16C 1/10* (2006.01)
*B62D 1/16* (2006.01)
*B62D 3/02* (2006.01)

(52) U.S. Cl.
CPC ............ *A01D 34/82* (2013.01); *B62D 1/163* (2013.01); *B62D 3/02* (2013.01); *B62D 9/00* (2013.01); *B62D 65/00* (2013.01); *F16C 1/106* (2013.01); *Y10T 29/49622* (2015.01); *Y10T 74/2042* (2015.01); *Y10T 74/20402* (2015.01)

(58) Field of Classification Search
CPC ........ A01D 34/64; A01D 34/82; A01D 34/66; F16C 1/106; Y10T 74/2042; Y10T 74/20402; Y10T 29/49622
See application file for complete search history.

(56) References Cited

U.S. PATENT DOCUMENTS

| | | |
|---|---|---|
| 4,364,577 A * | 12/1982 | Tateyama ................ B62D 7/02 280/92 |
| 4,367,881 A | 1/1983 | Williams |
| 4,957,183 A | 9/1990 | Mullett et al. |
| 5,485,893 A | 1/1996 | Summers |
| 5,667,032 A | 9/1997 | Kamlukin |
| 5,687,443 A | 11/1997 | Moore |
| 6,131,380 A | 10/2000 | Browning |
| 6,748,729 B1 | 6/2004 | Johns |
| 2002/0017780 A1 | 2/2002 | Erickson et al. |
| 2004/0040769 A1 | 3/2004 | Richey et al. |
| 2006/0266149 A1 | 11/2006 | Nybakken |

* cited by examiner

LAWN CARE VEHICLE WITH REAR WHEEL STEERING ASSEMBLY

CROSS-REFERENCE TO RELATED APPLICATIONS

This application is a continuation of U.S. application Ser. No. 14/131,240 filed Jan. 7, 2014, which is a national stage entry of PCT/US2011/043616 filed Jul. 12, 2011, the entire contents of each of which are hereby incorporated herein by reference.

TECHNICAL FIELD

Example embodiments generally relate to lawn care vehicles and, more particularly, relate to steering assembly for vehicles configured for performing lawn maintenance with rear wheel steering.

BACKGROUND

Lawn care tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines (e.g., less than 200 cubic centimeters (cc)) and are relatively inexpensive. Meanwhile, at the other end of the spectrum, riding lawn mowers, such as lawn tractors, can be quite large and sometimes have engines exceeding 400 cc. Riding lawn mowers can sometimes also be configured with various functional accessories (e.g., trailers, tillers and/or the like) in addition to grass cutting components. Riding lawn mowers provide the convenience of a riding vehicle as well as a typically larger cutting deck as compared to a walk-behind model.

By their very nature, riding lawn mowers include steering assemblies that are used to direct the movement of the riding lawn mowers. The steering assemblies often take the familiar form of a steering wheel. However, handlebar assemblies have also been used in some cases. More recently, some zero turn mowers have employed separate steering levers or even a joystick to provide steering functionality. There are clearly a number of steering assembly options from which to choose when an operator considers purchasing a riding lawn mower based on performance criteria, budget restrictions, or personal preference. However, each different type of steering assembly has corresponding different technical challenges associated therewith.

BRIEF SUMMARY OF SOME EXAMPLES

Accordingly, in order to improve space efficiency with respect to provision of a steering assembly for use on a lawn care vehicle that employs rear wheel steering, some example embodiments may provide a steering system that employs steering cables that run along a single side of the lawn care vehicle. By running cables down a single side of the lawn care vehicle, a reduction in both the space consumed and the number of parts that are required for implementation of the steering functionality of the rear wheel steering embodiment may be achieved.

In one example embodiment, a riding lawn care vehicle is provided. The riding lawn care vehicle may include a frame and a steering assembly. Wheels of the riding lawn care vehicle may be attachable to the frame. The steering assembly may include a steering wheel operably coupled to rear wheels of the riding lawn care vehicle via a cable system. The cable system may include a first cable portion, a second cable portion and a pulley assembly. The first and second cable portions may each contact a steering column pulley at respective first ends of the first and second cable portions. The steering column pulley may be configured to pull a corresponding one of the first cable portion or the second cable portion based on a direction of rotation of the steering wheel. The first and second cable portions may each be in operable communication with a steering disc at respective second ends of the first and second cable portions. The steering disc may provide translation of movement of the first cable portion and the second cable portion into corresponding movement of the rear wheels. The pulley assembly may be configured such that each pulley of the pulley assembly handles both the first cable portion and the second cable portion as the first cable portion and the second cable portion are conveyed from the steering column pulley to the steering disc to translate motion of the steering column pulley to the steering disc.

In another example embodiment, a cable system is provided. The cable system may provide operable coupling between a steering wheel of a riding lawn care vehicle and rear wheels of the riding lawn care vehicle. The cable system may include a first cable portion, a second cable portion and a pulley assembly. The first and second cable portions may each contact a steering column pulley at respective first ends of the first and second cable portions. The steering column pulley may be configured to pull a corresponding one of the first cable portion or the second cable portion based on a direction of rotation of the steering wheel. The first and second cable portions may each be in operable communication with a steering disc at respective second ends of the first and second cable portions. The steering disc may provide translation of movement of the first cable portion and the second cable portion into corresponding movement of the rear wheels. The pulley assembly may be configured such that each pulley of the pulley assembly handles both the first cable portion and the second cable portion as the first cable portion and the second cable portion are conveyed from the steering column pulley to the steering disc to translate motion of the steering column pulley to the steering disc.

In another example embodiment, a method of providing rear wheel steering for a riding lawn care vehicle is provided. The method may include providing a steering assembly including a steering wheel operably coupled to rear wheels of the riding lawn care vehicle via a cable system and disposing a first cable portion and a second cable portion of the cable system in contact with a steering column pulley at respective first ends of the first and second cable portions. The steering column pulley may be configured to pull a corresponding one of the first cable portion or the second cable portion based on a direction of rotation of the steering wheel. The first and second cable portions may each be in operable communication with a steering disc at respective second ends of the first and second cable portions. The method may further include providing translation of movement of the first cable portion and the second cable portion into corresponding movement of the rear wheels via rotation of the steering disc. Providing translation of movement may include utilizing a pulley assembly in which each pulley of the pulley assembly handles both the first cable portion and the second cable portion as the first cable portion and the second cable portion are conveyed from the steering column pulley to the steering disc to translate motion of the steering column pulley to the steering disc.

Some example embodiments may improve space efficiency of a riding lawn care vehicle and allow manufacturers to more efficiently design and produce such vehicles.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1A:
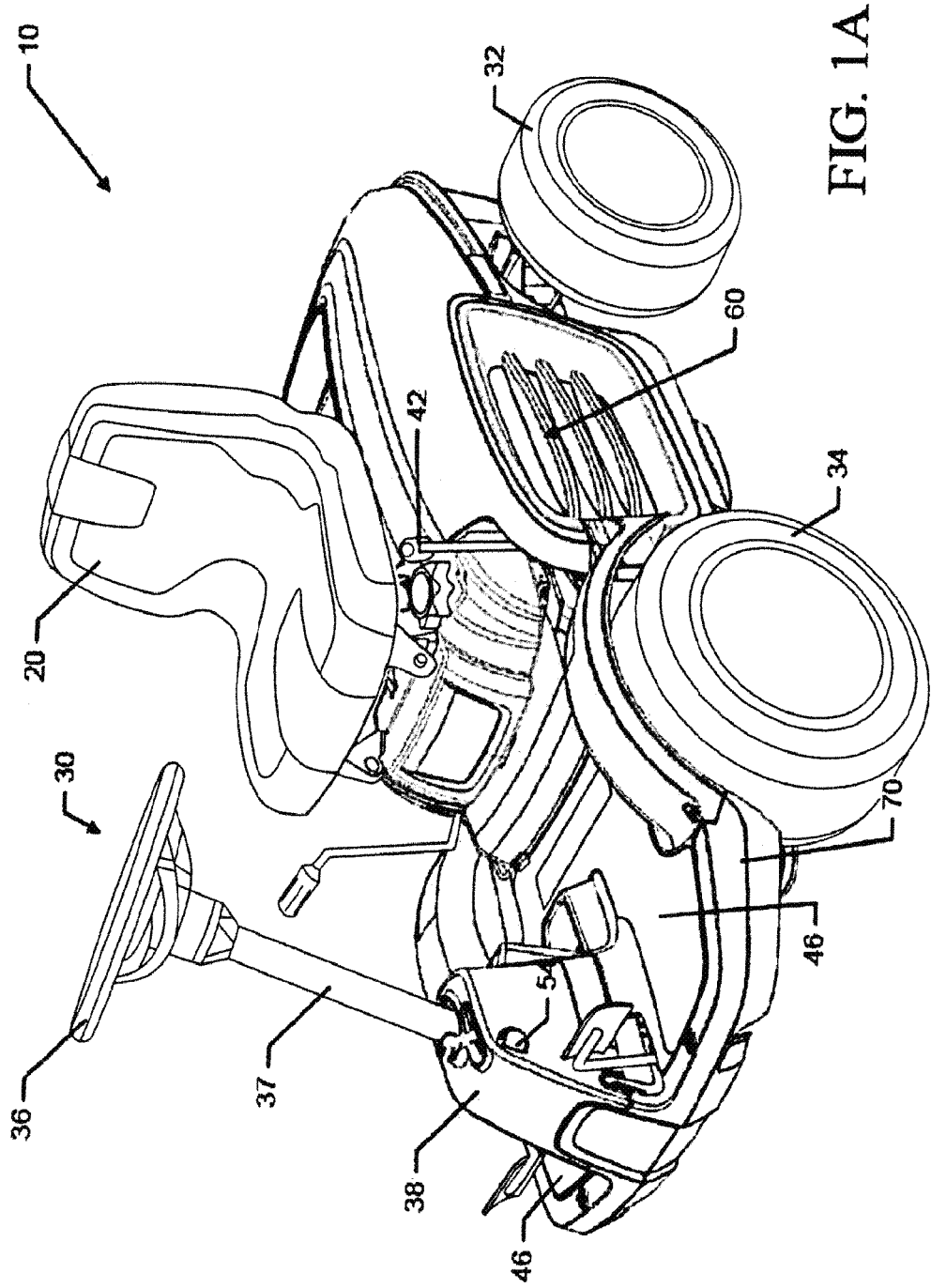
FIG. 1A illustrates a perspective view of a riding lawn care vehicle according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments may improve space efficiency with respect at least to the implementation of steering functionality of lawn care vehicles such as, for example, riding lawn mowers. In this regard, for example, some embodiments may employ a cable system to support rear wheel steering functionality, but may run the cable system only on one side of the lawn care vehicle. As such, since the cables only run down one side of the lawn care vehicle, less space may be consumed by the cable system and fewer components may be used to support the operation of the cable system.

Figure 1B:
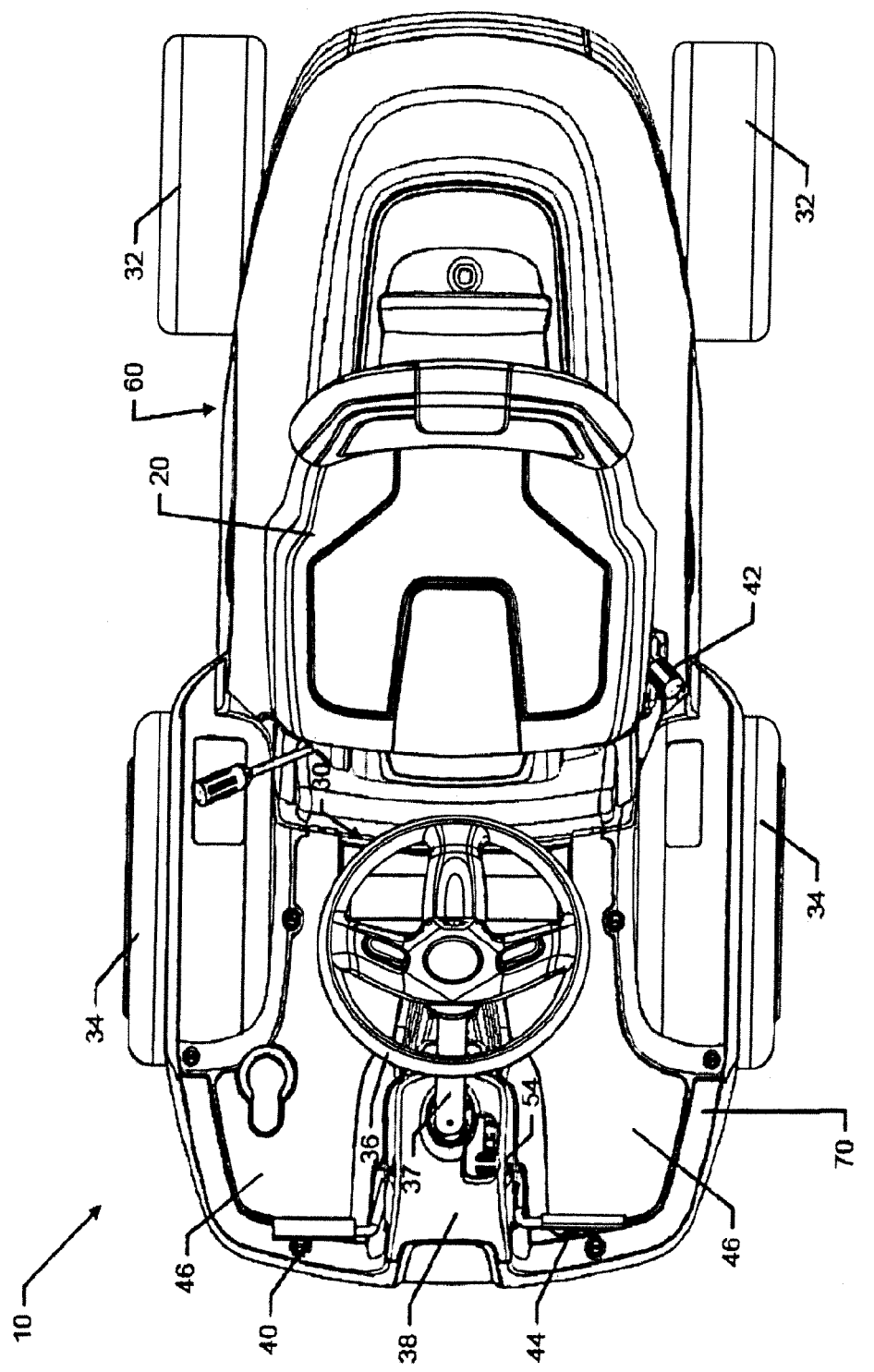
FIG. 1B illustrates a top view of the riding lawn care vehicle according to an example embodiment.

FIG. 1, which includes FIGS. 1A and 1B, illustrates a riding lawn care vehicle 10 having a rear wheel steering assembly according to an example embodiment. In this regard, FIG. 1A illustrates a perspective view of the riding lawn care vehicle 10 according to an example embodiment, and FIG. 1B illustrates a top view of the riding lawn care vehicle 10 according to an example embodiment. In some embodiments, the riding lawn care vehicle 10 may include seat 20 that may be disposed at a center, rear or front portion of the riding lawn care vehicle 10. The riding lawn care vehicle 10 may also include a steering assembly 30 (e.g., a steering wheel, handle bars, or the like) functionally connected to rear wheels 32 of the riding lawn care vehicle 10 to allow the operator to steer the riding lawn care vehicle 10. Since steering control is provided to the rear wheels 32, the front wheels 34 may not receive steering inputs in some embodiments. The operator may sit on the seat 20, which may be disposed to the rear of the steering assembly 30 to provide input for steering of the riding lawn care vehicle 10 via the steering assembly 30.

In an example embodiment, the steering assembly 30 may include a steering wheel 36 and a steering column 37. The steering column 37 may operably connect to additional steering assembly components described in greater detail below. Moreover, in some embodiments, the steering column 37 may extend into a steering console 38, which may provide a cover to improve the aesthetic appearance of the riding lawn care vehicle 10 by obscuring the view of various mechanical components associated with the steering assembly 30. The riding lawn care vehicle 10 may also include additional control related components such as one or more speed controllers 40, cutting height adjuster 42 and/or cutting unit lifting controller 44. Some of the controllers, such as the speed controllers 40 and the cutting unit lifting controller 44, may be provided in the form of foot pedals that may sit proximate to a footrest 46 (which may include a portion on both sides of the riding lawn care vehicle 10 (e.g., on opposite sides of the steering console 38) to enable the operator to rest his or her feet thereon while seated in the seat 20.

Figure 2:
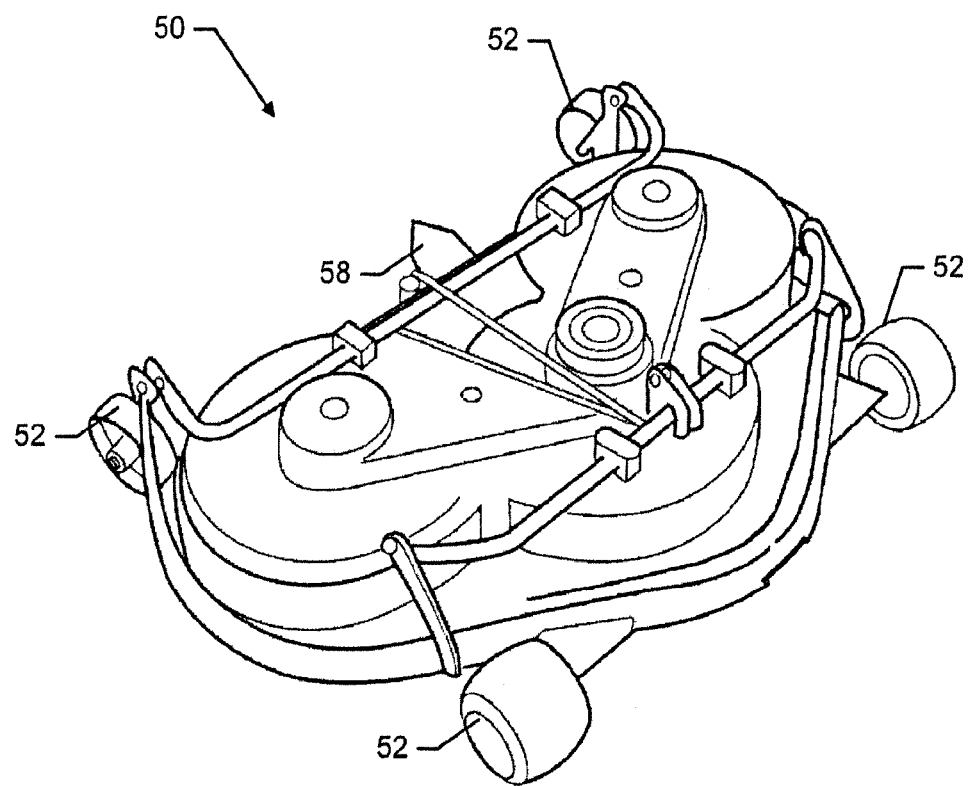
FIG. 2 illustrates portions of a cutting deck of the riding lawn care vehicle according to an example embodiment.

The riding lawn care vehicle 10 may also include, or be configured to support attachment of, a cutting deck 50 having at least one cutting blade mounted therein. FIG. 2 illustrates portions of the cutting deck 50 according to an example embodiment. The cutting deck 50 may be a removable attachment that may be positioned in front of the front wheels 34 in a position to enable the operator to cut grass using the cutting blade when the cutting blade is rotated below the cutting deck 50 and the cutting deck 50 is in a cutting position. When operating to cut grass, the grass clippings may be captured by a collection system, mulched, or expelled from the cutting deck 50 via either a side discharge or a rear discharge.

Figure 3:
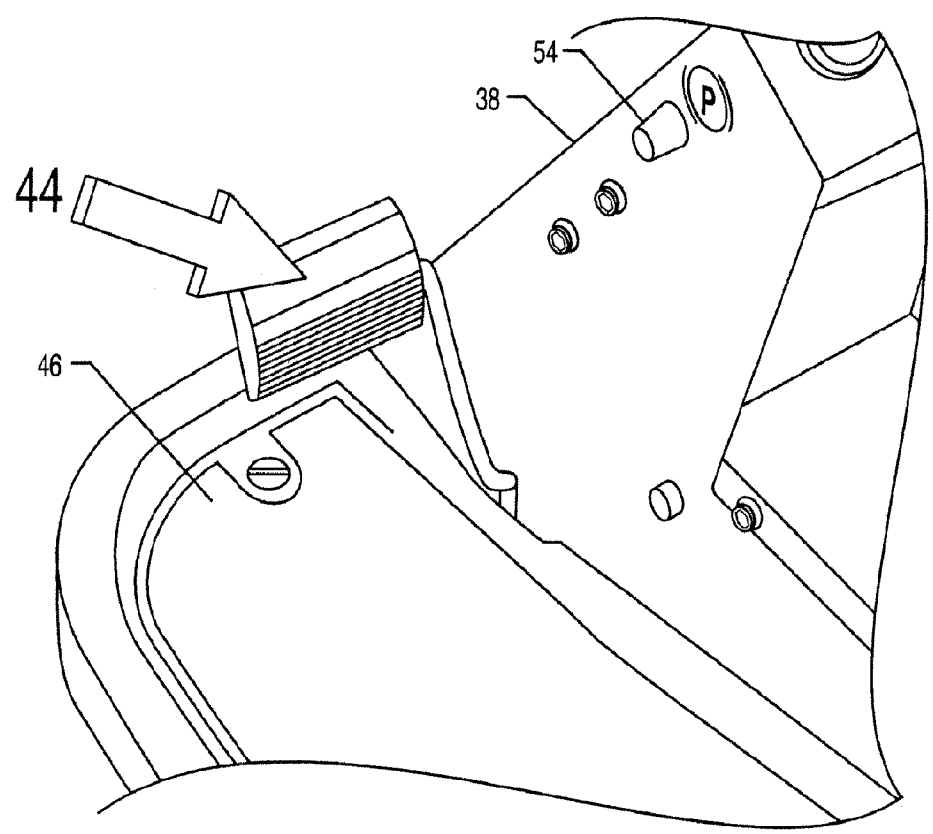
FIG. 3 illustrates a perspective view of a cutting unit lifting controller of the riding lawn care vehicle according to an example embodiment.

In an example embodiment, the cutting deck 50 may be elevated or lifted out of direct contact with the ground via the cutting unit lifting controller 44, a portion of which is shown in greater detail in FIG. 3. In this regard, the cutting unit lifting controller 44 may be a foot pedal that operates linkages to lift the cutting deck 50 upward. Lifting the cutting deck 50 may enable the riding lawn care vehicle 10 to traverse certain rough terrain or obstacles (e.g., small rocks, curbs, or other features) or may otherwise be preferable for some operators when in a transit mode, or when the riding lawn care vehicle 10 is not actively being used in a cutting operation. The height of the blades within the cutting deck 50 may also be adjusted using the cutting height adjuster 42. In this regard, the cutting height adjuster 42 may be a lever that is operably connected to the blades via linkages (not shown) to adjust the height of the blades relative to the ground when the cutting deck 50 is lowered into a cutting position. In some embodiments, the cutting deck 50 itself may include wheels 52 to help ensure that the cutting deck 50 stays relatively level during operation to provide an even cut.

FIG. 3 illustrates a perspective view of the cutting unit lifting controller 44 according to an example embodiment. As shown in FIG. 3, the cutting unit lifting controller 44 may be provided as a pedal. Of note, although FIGS. 1 and 3 illustrate the cutting unit lifting controller 44 being on the left side of the steering console 38, it could alternatively be on the right side or even at some other location in other example embodiments. In some embodiments, the steering console 38 may also improve the aesthetic appearance of the riding lawn care vehicle 10 by obscuring the view of various mechanical components associated with the operation of the cutting unit lifting controller 44 for lifting and/or holding the cutting deck 50. In an example embodiment, when the cutting unit lifting controller 44 is depressed or pushed down (e.g., toward the footrest 46), the cutting deck 50 may be elevated (e.g., such that the wheels 52 are lifted off the ground). In some cases, the cutting deck 50 may remain elevated for the duration of any period during which the cutting unit lifting controller 44 is depressed. However, in other examples, a lifting lock 54 may be provided to enable locking the cutting unit lifting controller 44 in a locked position as described in greater detail below. The lifting lock 54 may be positioned on the steering console 38 in some embodiments. However, other locations may be utilized in alternate embodiments.

In embodiments in which the cutting deck 50 is removable, the cutting deck 50 may include blade drive components (e.g., belts, pulleys or other components, some of which are visible in FIG. 2) of the cutting deck 50 that may facilitate cutting using the cutting deck 50 during operation. The cutting deck 50 may also include a cutting deck mounting assembly 58 configured to mate with the riding lawn care vehicle 10 to join the cutting deck 50 to the riding lawn care vehicle 10. Of note, FIG. 1A and FIG. 1B illustrate the riding lawn care vehicle 10 with the cutting deck 50 removed. However, it should be appreciated that the cutting deck 50 may be attached as described above, and then lifted in some cases, as described herein.

In the pictured example embodiment of FIG. 1, an engine 60 of the riding lawn care vehicle 10 is disposed substantially below a seated operator. However, in other example embodiments, the engine 60 could be in different positions such as in front of or behind the operator. In some embodiments, the engine 60 may be operably coupled to one or more of the wheels of the riding lawn care vehicle 10 in order to provide drive power for the riding lawn care vehicle 10. In some embodiments, the engine 60 may be capable of powering two wheels, while in others, the engine 60 may power all four wheels of the riding lawn care vehicle 10. Moreover, in some cases, the engine 60 may manually or automatically shift between powering either two wheels or all four wheels of the riding lawn care vehicle 10. The engine 60, the steering assembly 30, the cutting deck 50, the seat 20 and other components of the riding lawn care vehicle 10 may be operably connected (directly or indirectly) to a frame 70 of the riding lawn care vehicle 10. The frame 70 may be a rigid structure configured to provide support, connectivity and interoperability functions for various ones of the components of the riding lawn care vehicle 10. In some embodiments, the frame 70 may be split or articulated such that, for example, the front wheels 34 are disposed on an opposite portion of the frame 70 than the portion of the frame on which the back wheels 32 are disposed with respect to an articulated joint in the frame 70.

In some example embodiments, the steering assembly 30 may be embodied as an assembly of metallic or other rigid components that may be welded, fitted, bolted or otherwise operably coupled to each other and coupled to the wheels (rear wheels 32 in this example) of the riding lawn care vehicle 10 to which steering inputs are provided. For example, the steering assembly 30 may include or otherwise be coupled with a steering cable assembly to translate rotational motion applied to the steering assembly 30 (and more particularly to the steering wheel 36) into directional inputs to orient the wheels accordingly. Other steering control systems may be employed in some alternative embodiments.

Figure 4A:
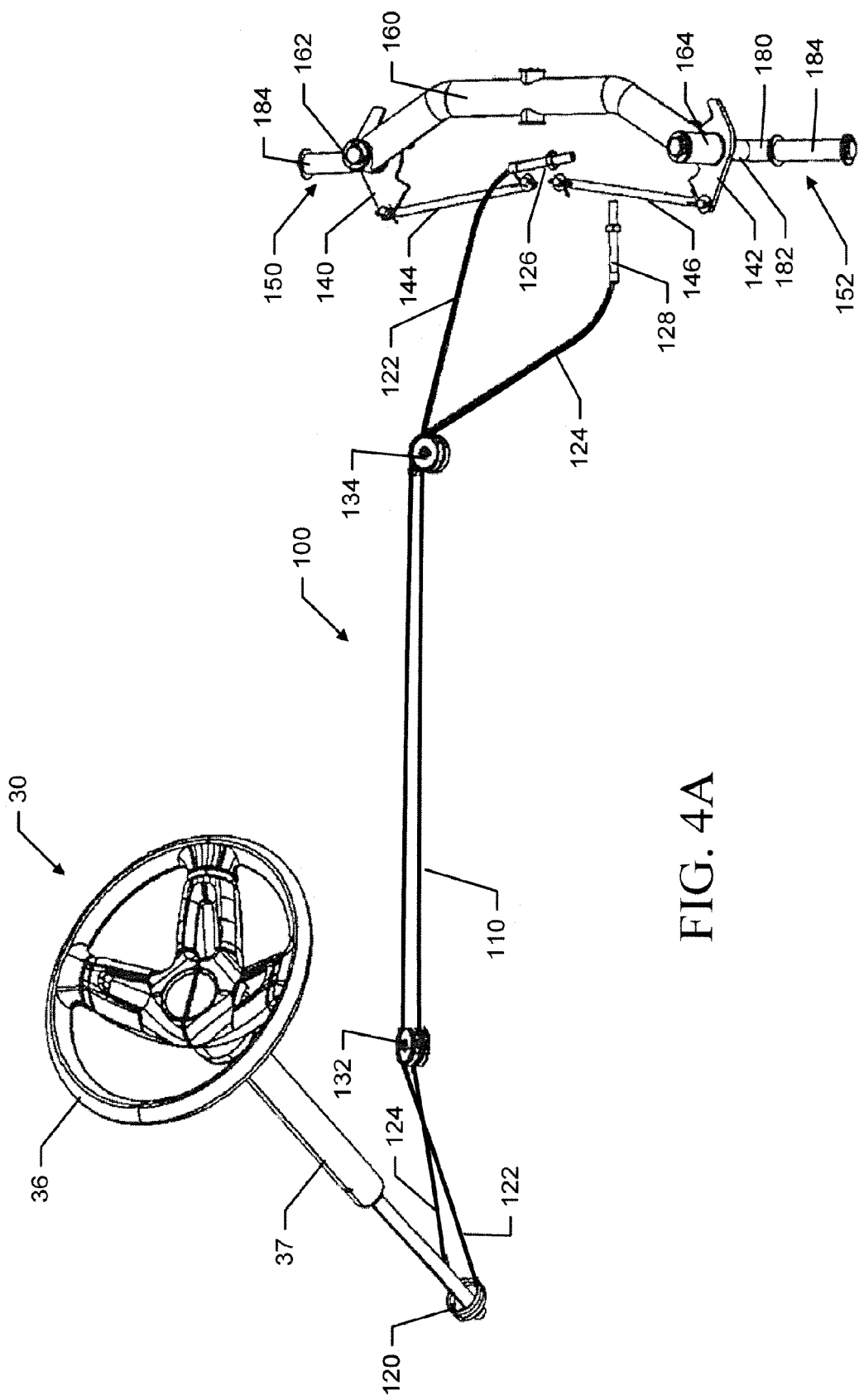
FIG. 4A illustrates a perspective view from the side of a cable system of the riding lawn care vehicle according to an example embodiment.
Figure 4B:
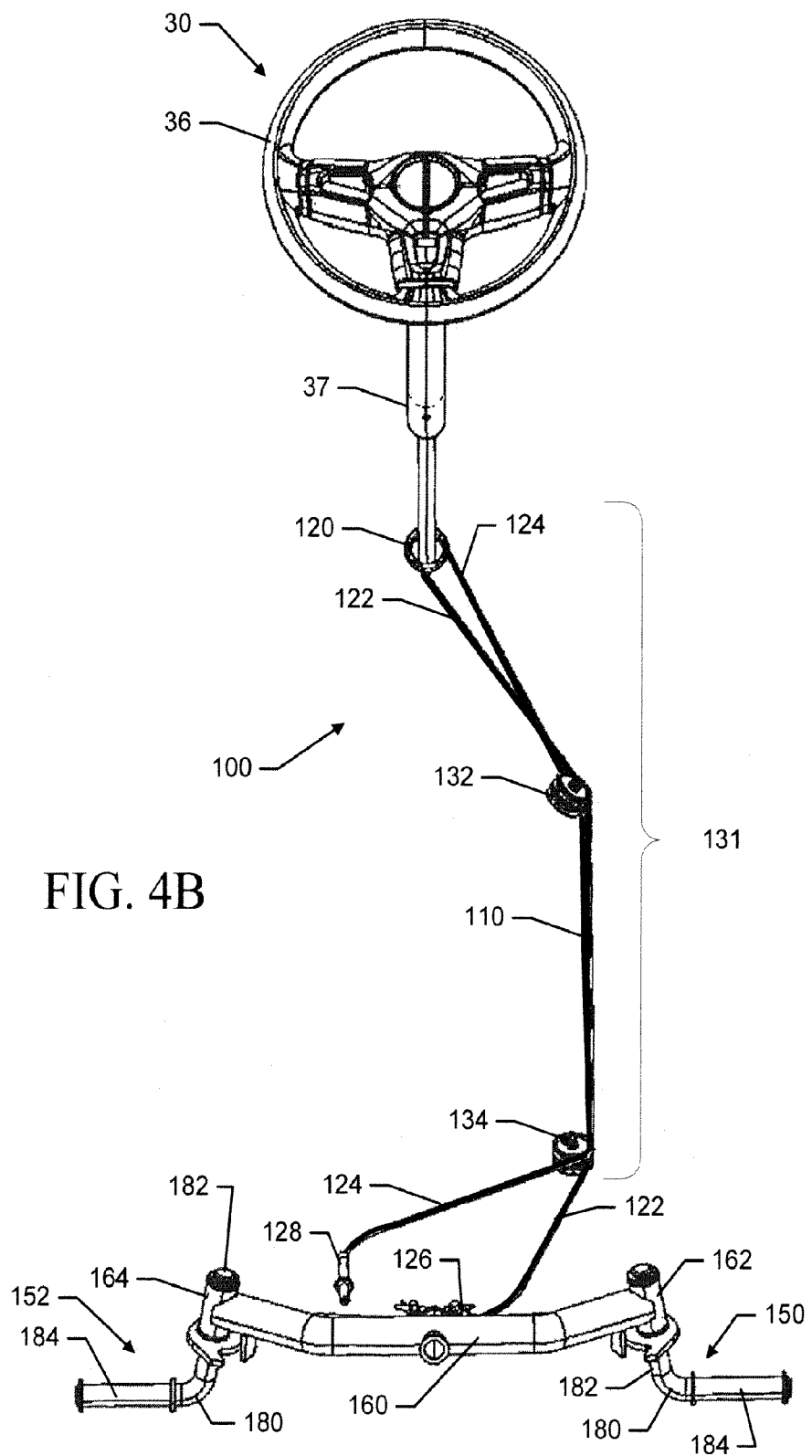
FIG. 4B illustrates a perspective view from the back looking down onto the cable system according to an example embodiment.
Figure 5:
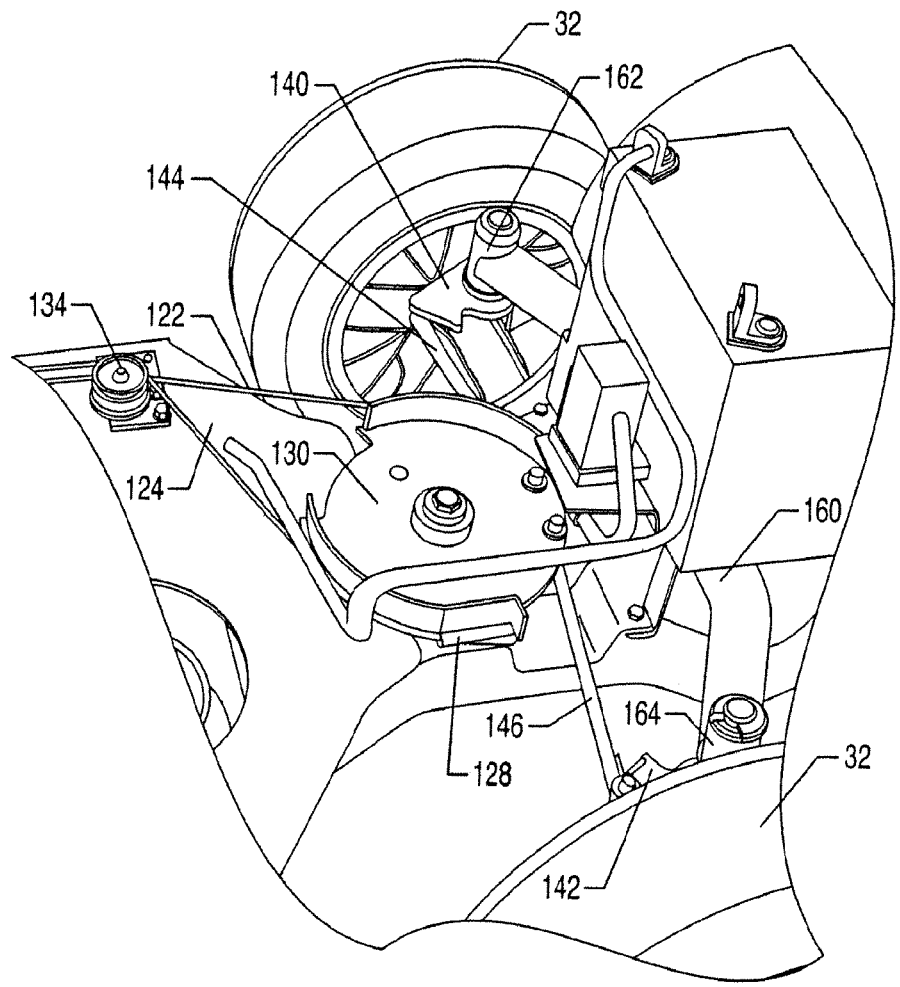
FIG. 5 illustrates a perspective view of portions of the cable system from the side of the riding lawn care vehicle to show the cable system within the context of other components according to an example embodiment.
Figure 6:
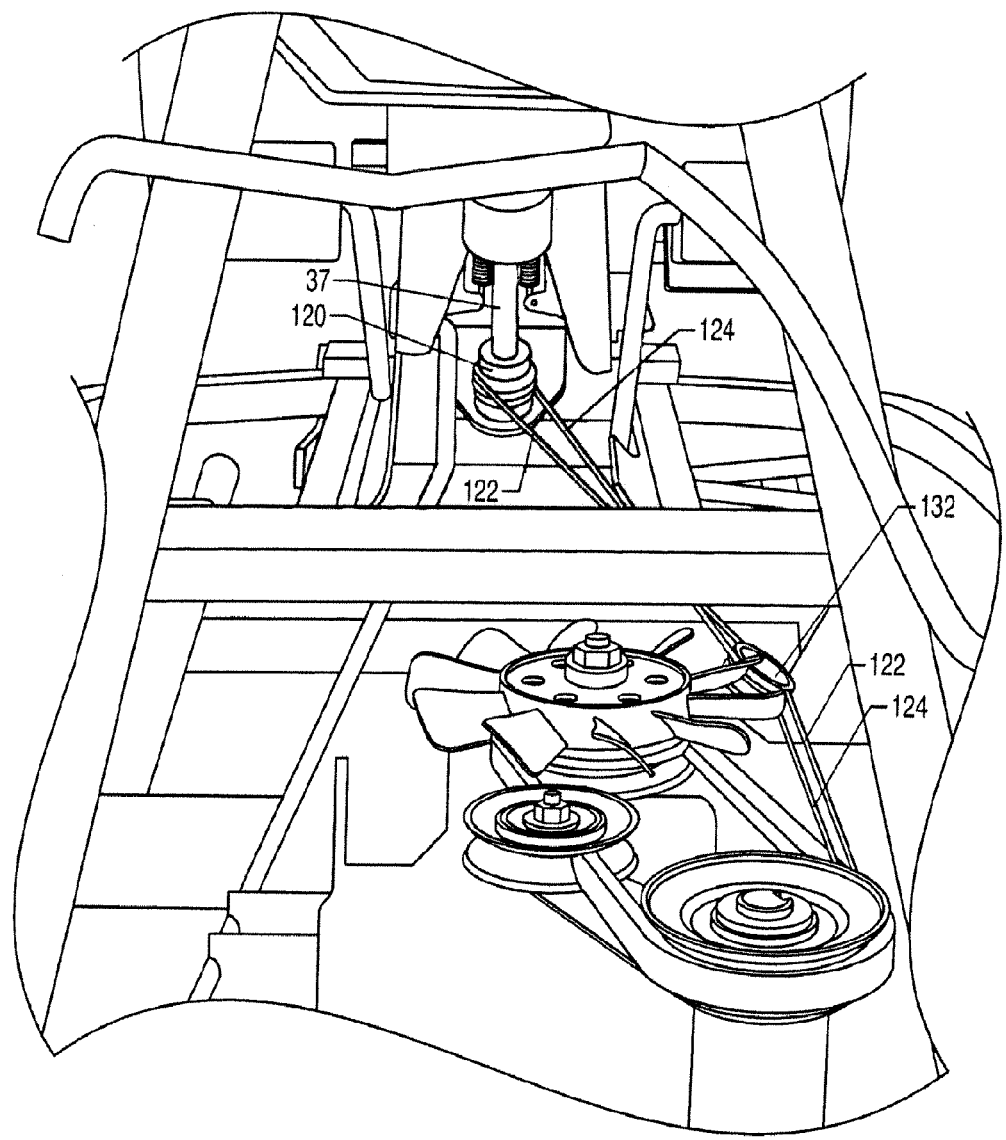
FIG. 6 illustrates a perspective view of portions of the cable system looking from the vehicle rear toward a steering column with selected components removed according to an example embodiment.

FIGS. 4-6 illustrate more detailed views of some portions of the steering assembly 30 to illustrate an example embodiment. In this regard, FIG. 4, which includes FIGS. 4A and 4B, illustrates isolated perspective views of the steering assembly 30 according to an example embodiment. Other components have been removed from the views in FIG. 4 in order to facilitate a clear and concise description of the cable system 100 of an example embodiment. FIG. 4A illustrates a perspective view from the side of the cable system 100 and FIG. 4B illustrates a perspective view from the back looking down onto the cable system 100. FIG. 5 illustrates a perspective view of portions of the cable system 100 from the side of the riding lawn care vehicle 10 to show the cable system 100 within the context of other components according to an example embodiment. In this regard, the view shown in FIG. 5 is a side view with selected components removed. Meanwhile, FIG. 6 illustrates a perspective view of portions of the cable system 100 looking from the vehicle rear toward the steering column 37 with selected components removed.

Referring now to FIGS. 4-6, cable system 100 may include a cable 110 that may wrap at least partially around a steering column pulley 120 attached to a distal end of the steering column 37. The steering column pulley 120 may frictionally engage the cable 110 such that when the steering column pulley 120 is rotated (e.g., responsive to rotation of the steering wheel 36), the cable 110 is pulled through the steering column pulley 120 in the same direction as the direction of rotation of the steering wheel 36. Although FIG. 4 illustrates an example in which the turn ratio for the steering wheel 36 and the steering column pulley 120 is 1:1, other embodiments may employ gears and/or the like to adjust the turn ratio, if desired.

In an example embodiment, a substantially equal amount of the cable 110 may be disposed on each side of the steering column pulley 120 when the steering wheel 37 is in a neutral or twelve o'clock position. For purposes of explanation, a portion of the cable 110 that is pulled when the steering wheel is turned clockwise may be referred to as a first cable portion 122 and a portion of the cable 110 that is pulled when the steering wheel 36 is turned counterclockwise may be referred to as a second cable portion 124. The first and second cable portions 122 and 124 may be portions of the same unitary cable in some cases. However, in other cases, the first and second cable portions 122 and 124 may be distinct portions that may be joined together or have the ends thereof fixed to the steering column pulley 120 proximate to each other. Distal ends of the first cable portion 122 and second cable portion 124 may terminate at respective cable connectors (e.g., first cable connector 126 and second cable connector 128). The first and second cable connectors 126 and 128 may then engage a steering disc 130 (see FIG. 5), which may be located substantially between the rear wheels 32.

In an example embodiment, the first cable portion 122 and the second cable portion 124 may each be run from the steering column pulley 120 (which may be located proximate to a front end of the riding lawn care vehicle 10) back to the steering disc 130 along one side of the riding lawn care vehicle 10 using a single cable-conveying pulley assembly 131 disposed along the corresponding one side of the riding lawn care vehicle 10. Although FIGS. 5 and 6 illustrate the first and second cable portions 122 and 124 running down the right side of the riding lawn care vehicle 10, and the pulley assembly 131 therefore also being disposed on the right side of the riding lawn care vehicle 10, alternative embodiments may run the first and second cable portions 122 and 124 down the left side of the riding lawn care vehicle 10 (or the middle portion thereof). In an example embodiment, to facilitate running both the first and second cable portions 122 and 124, the pulley assembly 131 may include a front double pulley 132 and a back double pulley 134 that are each disposed along a same side of the riding lawn care vehicle 10 to handle the cable system 100 and convey portions thereof rearward for communication with the steering disc 130.

In some embodiments each of the front double pulley 132 and the back double pulley 134 may include two wheels mounted to the same shaft (or different shafts that are aligned with each other). As such, the wheels of each double pulley may be enabled to move independently of each other, and therefore in opposite directions to support the pull action on one cable portion (e.g., the first cable portion 122) and a corresponding push action on the other cable portion (e.g., the second cable portion 124). As shown in FIGS. 4-6, the front double pulley 132 may consolidate handling both the first cable portion 122 and the second cable portion 124 for passage rearward to the back double pulley 134 using one pulley. The back double pulley 134 may also consolidate handling of the first and second cable portions 122 and 124 at a single component, but may further provide a fixed point from which the first cable portion 122 and the second cable portion 124 may diverge to engage opposite sides of the steering disc 130. Accordingly, both cables that provide inputs for pulling or otherwise changing the orientation of the steering disc 130 may be communicated back toward a rear of the riding lawn care vehicle 10 from the steering wheel 36 using the pulley assembly 131 disposed along one side of the riding lawn care vehicle 10. As shown in FIG. 4, an axis of the front double pulley 132 may be oriented differently than an axis of the back double pulley 134 and an axis of the steering column pulley 120. In an example embodiment, the orientations of each of the pulleys may be selected to enable the first and second cable portions 122 and 124 to be conveyed back from the steering column pulley 120 to the steering disc 130 without the first and second cable portions coming into contact with each other even though their positions relative to each other swap (i.e., the cables cross) as they are conveyed back to the steering disc 130.

The steering disc 130 may have a fixed axis of rotation, but may be allowed to rotate responsive to the cable 110 being pulled in either direction based on rotation of the steering wheel 36 via communication of a corresponding pull action via the pulley assembly 131. In an example embodiment, a size of the steering disc 130 may be selected based on the size of the steering column pulley 120 such that a certain amount of rotation of the steering column pulley 120 causes a corresponding known amount of rotation of the steering disc 130, when the first and second cable portions 122 and 124 move, based on the ratio of sizes of the steering column pulley 120 and the steering disc 130. The steering disc 130 may be connected to a first steering knuckle 140 and a second steering knuckle 142 via a first tie rod 144 and a second tie rod 146, respectively. The first and second steering knuckles 140 and 142 may each be affixed to corresponding ones of a first axle rod 150 and a second axle rod 152. The first and second axle rods 150 and 152 may be rotatably mounted to opposite ends of an axle mount 160 that may form a portion of the frame 70, or may be connected to the frame 70. The axle mount 160 may extend substantially perpendicularly to the longitudinal length of the riding lawn care vehicle 10 substantially between the rear wheels 32. The rear wheels 32 may be affixed to the first and second axle rods 150 and 152, respectively.

In some examples, the axle mount 160 may be structured as a single assembly, weldment, rod, tube or other support structure having a first distal end that rotatably engages the first axle rod 150 and a second distal end that rotatably engages the second axle rod 152. In some embodiments, the first and second distal ends of the axle mount 160 may terminate in respective first and second sleeves 162 and 164. The first and second sleeves 162 and 164 may receive the first and second axle rods 150 and 152, respectively, therein. In some embodiments, the first and second sleeves 162 and 164 may further include bearings (e.g., a bushing, ball bearing or journal bearing) to facilitate rotational relative motion between the first and second sleeves 162 and 164 and the first and second axle rods 150 and 152, respectively.

In an example embodiment, first and second steering knuckles 140 and 142 may be relatively mirror image reproductions of each other oriented to operate on opposite sides of the riding lawn care vehicle 10. Similarly, the first and second axle rods 150 and 152 may be relatively mirror image reproductions of each other oriented to operate on opposite sides of the riding lawn care vehicle 10. Accordingly, for purposes of explanation, the first steering knuckle 140 and the first axle rod 150 will be described in greater detail below, but it should be appreciated that the second steering knuckle 142 and the second axle rod 150 are structured and function similarly (albeit for an opposite side of the riding lawn care vehicle 10).

The first steering knuckle 140 may be affixed to the first axle rod 150 proximate to a bottom portion of the first sleeve 162. The first steering knuckle 140 may, in some cases, be a bracket formed from sheet metal or another rigid material and may extend around all sides of the first axle rod 150. As such, a substantial portion of the first steering knuckle 140 may lie in a single plane, which may be perpendicular to the longitudinal length of the first sleeve 162. In some embodiments, the first steering knuckle 140 may include a receiving opening at a portion thereof to receive a rotatable pin that may connect the first tie rod 144 to the first steering knuckle 140 in a rotatable manner. The receiving opening may be positioned at a protruded portion of the first steering knuckle 140 which may be oriented substantially toward either the front or the back of the riding lawn care vehicle 10. By orienting the receiving opening accordingly, when the first tie rod 144 pushes or pulls responsive to rotation of the steering disc 130, a force may be exerted through the rotatable pin onto the first steering knuckle 140. The first axle rod 150 may then be caused to rotate within the first sleeve 162 based on the direction of the force imparted by the first tie rod 144.

During a turn, dependent upon which way the steering disc 130 turns, one of the first or second tie rods 144 or 146 may be pushed and the other of the first or second tie rods 144 or 146 may be pulled responsive to rotation of the steering disc 130. The steering disc 130 may be disposed substantially along a longitudinal centerline of the riding lawn care vehicle 10. In an example embodiment, the first and second tie rods 144 and 146 may each be connected to the steering disc 130 relatively proximate to each other. For example, if an after portion of the steering disc 130 that is oriented in line with the centerline of the riding lawn care vehicle 10 is considered to be the twelve o'clock position, the first and second tie rods 144 and 146 may connect to the steering disc 130 proximate to the twelve o'clock position (e.g., at the eleven o'clock and one o'clock positions, respectively). The first and second tie rods 144 and 146 may then extend away from the steering disc 130 in relatively opposite directions to engage the first and second steering knuckles 140 and 142, respectively.

Since the first and second steering knuckles 140 and 142 are affixed to the first and second axle rods 150 and 152, and the first and second axle rods 150 and 152 are rotatably mounted to the axle mount 160, movement of the first and second steering knuckles 140 and 142 responsive to rotation of the steering disc 130 causes a corresponding rotation (in the same direction) of the first and second axle rods 150 and 152. In other words, for example, when the steering wheel 36 is turned in the clockwise direction, the first cable portion 122 may be pulled toward the steering column pulley 120 and the first cable connector 126 may also be pulled and thereby initiate rotation of the steering disc 130. In this example, when the steering wheel 36 is turned clockwise (presumably to initiate a turn to the right), the rear wheels 32 would need to be caused to turn to be oriented to the left since rear wheel steering is employed. Accordingly, when the first cable connector 126 pulls on the steering disc 130, the steering disc 130 may rotate in a counter-clockwise direction. Such rotation of the steering disc 130 may cause the first tie rod 144 to push on the first steering knuckle 140 to impart a force on the first steering knuckle 140 to initiate a counter-clockwise rotation of the first axle rod 150 within the first sleeve 162. The counter-clockwise rotation of the first axle rod 150 may correspondingly turn the back right wheel of the riding lawn care vehicle 10 inward (or toward the left). Similarly, rotation of the steering disc 130 in the counter-clockwise direction may also cause the second tie rod 146 to push on the second steering knuckle 142 to impart a force on the second steering knuckle 142 to initiate a counter-clockwise rotation of the second axle rod 152 within the second sleeve 164. The counter-clockwise rotation of the second axle rod 152 may correspondingly turn the back left wheel of the riding lawn care vehicle 10 outward (or toward the left).

In an example embodiment, the first and second axle rods 150 and 152 may be further provided to initiate changes to the camber angle of the rear wheels 32 responsive to steering inputs to the right or left. In this regard, for example, the first and second axle rods 150 and 152 may be constructed to have at least two linear portions that are connected to each other by a bent portion 180. The two linear portions may include a spindle or top portion 182 that is inserted into one of the sleeves (e.g., the first sleeve 162 or the second sleeve 164) for rotatable connection therewith, and an axle or bottom portion 184 to which one of the rear wheels 32 is rotatably attached. In an example embodiment, the bent portion 180 may be formed such that the top portion 182 may form an obtuse angle with respect to the bottom portion 184. Moreover, in some embodiments, an angle formed between a longitudinal length of the sleeves and the longitudinal length of the axle mount 160 may be set such that, when the rear wheels 32 are straightened (e.g., due to the steering wheel 36 being oriented at the twelve o'clock position), a longitudinal length of the bottom portion 184 is substantially parallel to the driving surface or ground and the camber angle of the corresponding wheel is substantially zero. However, as a steering input is inserted by rotation of the steering wheel 36, the top portion 182 may rotate within the corresponding one of the sleeves (e.g., the first sleeve 162 or the second sleeve 164) and the camber angle may be adjusted to a non-zero value.

Figure 7A:
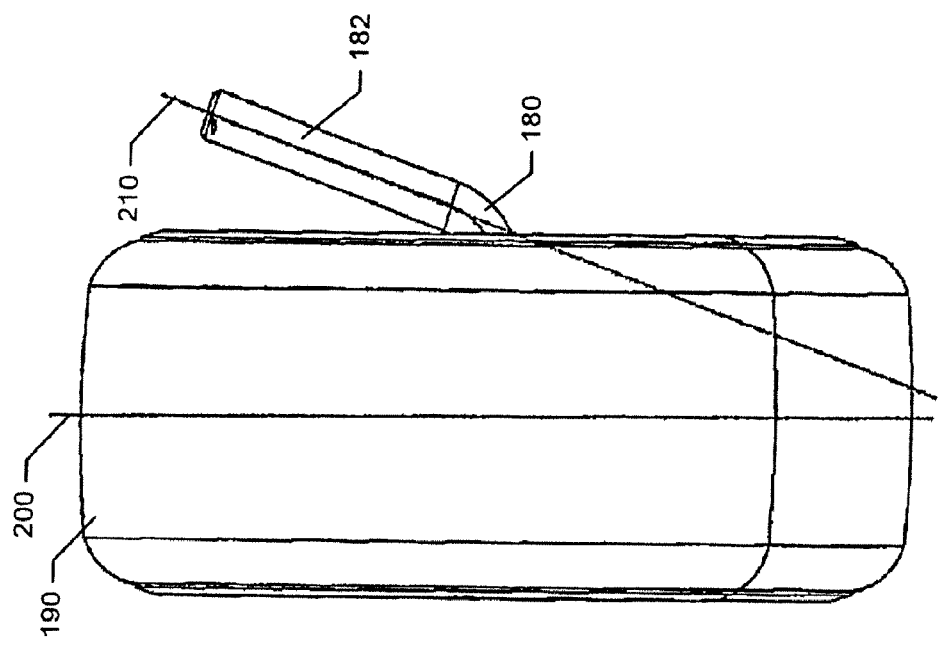
FIG. 7A illustrates a wheel in a positive camber angle state responsive to a steering wheel being rotated out of a neutral position to provide a steering input to the right or left according to an example embodiment.
Figure 7B:
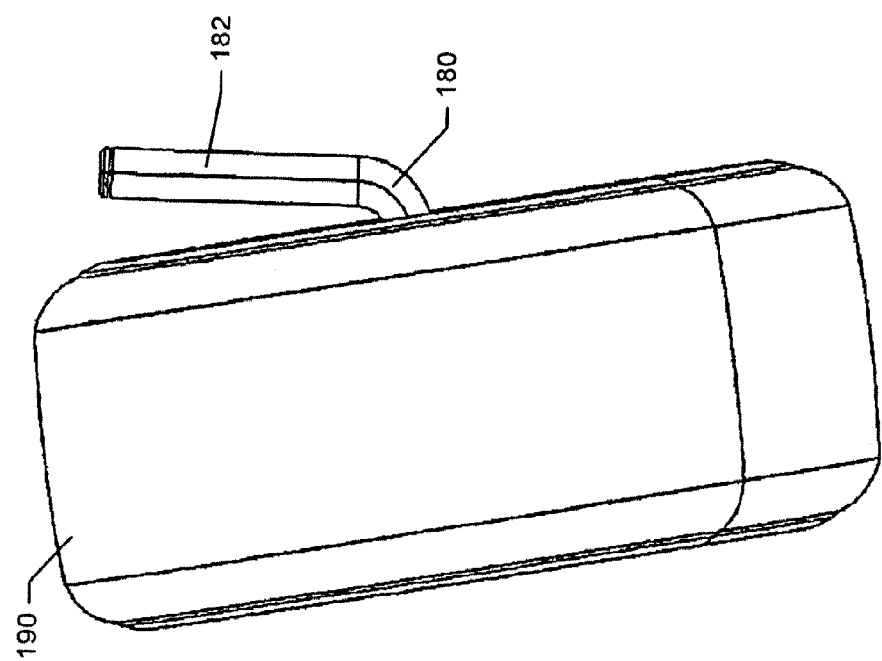
FIG. 7B illustrates the wheel in a zero camber angle state responsive to the steering wheel being at the twelve o'clock position according to an example embodiment.

FIG. 7, which includes FIGS. 7A and 7B, illustrates a wheel 190 (e.g., the right rear wheel) in both a zero camber angle state (e.g., when the steering wheel 36 is at the twelve o'clock position as shown in FIG. 7B) and a positive camber angle state (e.g., when the steering wheel 36 is rotated to provide a steering input to the right or left as shown in FIG. 7A). The camber angle is generally considered to be the angle made between the wheels and riding lawn care vehicle 10, or more specifically, the angle between the vertical axis of the wheels and the vertical axis of the riding lawn care vehicle 10 when viewed from the front or rear. In the example of FIG. 7, the top 192 of the wheel 190 is farther out than the bottom 194 of the wheel 190 to define a positive camber.

By angling the wheel when a turn is initiated, the turn radius of the corresponding wheel may be decreased. Thus, modification of the camber angle when steering inputs are received may increase the responsiveness of the riding lawn care vehicle 10 to steering inputs and, in particular, may decrease the turn radius of the riding lawn care vehicle 10. In an example embodiment, a wheel centerline 200 may be defined relative to the radial dimensions of the wheel through a center of the tread portion of the wheel 190. As such, the wheel centerline 200 may bisect the axis of rotation of the wheel 190. When the steering wheel 36 is in a neutral position (e.g., without any right or left steering input being inserted via rotation of the steering wheel 36 out of the twelve o'clock position), the wheel center line 200 may be substantially perpendicular to the driving surface or ground. Meanwhile, a spindle centerline 210 corresponding to a line drawn through the longitudinal center of the top portion 182 may extend toward the wheel centerline 200 to intersect the wheel centerline 200 at a position below the wheel 190. In some cases, it may be desirable for the wheel centerline 200 and the spindle centerline 210 to intersect below the wheel 190, but proximate to the surface of the wheel 190. Accordingly, the width of the wheel 190 may dictate the angle between the top portion 182 and the bottom portion 184. In this regard, in order to make the wheel centerline 200 and the spindle centerline 210 intersect proximate to the area below the wheel 190, as the width of the wheel increases, the angle between the wheel centerline 200 and the spindle centerline 210 also increases. Thus, when a wider wheel is used, the bent portion 180 may be made such that the angle between the top portion 182 and the bottom portion 184 increases in order to provide desirable camber angle changes when non-neutral steering inputs are provided.

In an example embodiment, when viewed from the side of the riding lawn care vehicle 10, the spindle centerline 210 may be substantially perpendicular to the driving surface or ground. Moreover, since the top portion 182 rotates within the sleeve, which is fixed relative to the frame 70 by attachment to the axle mount 160, the top portion 182 is maintained such that the spindle centerline 210 is perpendicular to the driving surface or ground when viewed from the side even when the top portion 182 is rotated. However, given that the top portion 182 rotates responsive to steering inputs to insert a camber angle when the steering wheel 36 is rotated out of the neutral position, it should be appreciated that the camber angle may increase as the amount of deflection from the neutral position increases. Thus, for example, as a full right turn input is relaxed by rotating the steering wheel 36 counter-clockwise back toward the neutral position, the camber angle may decrease until the neutral position is reached. When the neutral position is reached, the camber angle may be zero. If the steering wheel 36 is further rotated counter-clockwise to a full left turn, the camber angle will increase from zero at the neutral position to some maximum value at the full left turn position.

An example embodiment, such as is shown in FIGS. 4-6, may provide for conveying steering inputs from a steering wheel or other steering input device to rear wheels using a cable system that runs cable down only one side of the riding lawn care vehicle. By running cable only down one side of the riding lawn care vehicle, the engine (e.g., engine 60) may be disposed between the front and back wheels (see FIG. 1). In some embodiments, the engine 60 may be more specifically disposed under the seat 20 and between the steering column 37 and the steering disc 130. The cables may extend around one side of the engine 60 in this configuration. A battery for powering some components of the riding lawn care vehicle 10 may also be provided. In some embodiments, the battery may be provided between the rear wheels 32 (e.g., over the axle mount 160). Such configuration may, in some cases, provide weight over the rear wheels 32 to facilitate steering functionality given that the engine 60 and the weight associated therewith may be moved forward of the rear wheels 32.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A riding lawn care vehicle comprising:
    a frame to which wheels of the riding lawn care vehicle are operably coupled; and
    a steering assembly comprising a steering wheel operably coupled to rear wheels of the riding lawn care vehicle via a cable system,
    wherein the cable system comprises:
        a first cable portion and a second cable portion, the first cable portion comprising a first end of the first cable portion and a second end of the first cable portion, the second cable portion comprising a first end of the second cable portion and a second end of the second cable portion, the respective first ends of the first and second cable portions being operably coupled to a steering column pulley, the steering column pulley being configured to pull a corresponding one of the first cable portion or the second cable portion based on a direction of rotation of the steering wheel, the respective second ends of the first and second cable portions being operably coupled to a steering disc, the steering disc being configured to provide translation of movement of the first cable portion and the second cable portion into corresponding movement of the rear wheels, and
        a pulley assembly comprising a first pulley and a second pulley in which each of the first pulley and the second pulley of the pulley assembly handles both the first cable portion and the second cable portion as the first cable portion and the second cable portion are conveyed rearward toward the steering disc to translate motion of the steering column pulley to the steering disc,
    wherein the pulley assembly is configured such that the first pulley and the second pulley of the pulley assembly are disposed along a same side of the riding lawn care vehicle.

2. The riding lawn care vehicle of claim 1, wherein the pulley assembly is configured such that the first and second cable portions each contact the first pulley and the second pulley on an opposite side of the first pulley and the second pulley relative to a longitudinal centerline of the riding lawn care vehicle.

3. The riding lawn care vehicle of claim 2, wherein the first pulley comprises a front pulley receiving the first cable portion and the second cable portion extending from the steering column pulley, and the second pulley comprises a back pulley providing the first cable portion and the second cable portion toward the steering disc.

4. The riding lawn care vehicle of claim 3, wherein the front pulley and the back pulley are each double pulleys comprising two independently rotatable wheels, and wherein one of the two independently rotatable wheels receives the first cable portion and the other of the two independently rotatable wheels receives the second cable portion.

5. The riding lawn care vehicle of claim 3, wherein an axis of rotation of the front pulley, an axis of rotation of the back pulley, and an axis of rotation of the steering column pulley are each oriented differently to convey the first and second cable portions from the steering column pulley toward the steering disc while crossing the first and second cable portions such that the first cable portion is operably coupled to a first side of the steering column pulley that is opposite, relative to the centerline of the riding lawn care vehicle, of a first side of the steering disc to which the first cable portion is operably coupled, and the second cable portion is operably coupled to a second side of the steering column pulley that is opposite, relative to the centerline, of a second side of the steering disc to which the second cable portion is operably coupled.

6. The riding lawn care vehicle of claim 1, wherein a length of the first cable portion is equal to a length of the second cable portion when the steering wheel is in a neutral position.

7. The riding lawn care vehicle of claim 1, wherein the steering disc is rotatably disposed substantially between the rear wheels, and wherein a first tie rod operably couples the steering disc to a first one of the rear wheels and a second tie rod operably couples the steering disc to a second one of the rear wheels.

8. The riding lawn care vehicle of claim 7, further comprising an axle mount fixed relative to the frame, the axle mount being disposed to extend between the rear wheels proximate to the steering disc, wherein the axle mount comprises a first sleeve and a second sleeve disposed at opposite distal ends of the axle mount, the first and second sleeves receiving respective portions of a first axle rod and a second axle rod rotatably mounted therein.

9. The riding lawn care vehicle of claim 8, further comprising a first steering knuckle disposed on the first axle rod and connected to the first tie rod to cause rotation of the first axle rod within the first sleeve responsive to movement of the first tie rod when the steering disc rotates, and a second steering knuckle disposed on the second axle rod and connected to the second tie rod to cause rotation of the second axle rod within the second sleeve responsive to movement of the second tie rod when the steering disc rotates.

10. The riding lawn care vehicle of claim 9, wherein the first and second tie rods are operably coupled to the steering disc at a location proximate to each other.

11. The riding lawn care vehicle of claim 1, wherein the steering column pulley comprises a gear operably coupled to the respective first ends of the first and second cable portions.

12. The riding lawn care vehicle of claim 1, wherein the first pulley and the second pulley of the pulley assembly are disposed along a right side of the riding lawn care vehicle.

13. A cable system for providing operable coupling between a steering wheel of a riding lawn care vehicle and rear wheels of the riding lawn care vehicle, the cable system comprising:
a first cable portion and a second cable portion, the first cable portion comprising a first end of the first cable portion and a second end of the first cable portion, the second cable portion comprising a first end of the second cable portion and a second end of the second cable portion, the respective first ends of the first and second cable portions being operably coupled to a steering column pulley, the steering column pulley being configured to pull a corresponding one of the first cable portion or the second cable portion based on a direction of rotation of the steering wheel, the respective second ends of the first and second cable portions being operably coupled to a steering disc, the steering disc being configured to provide translation of movement of the first cable portion and the second cable portion into corresponding movement of the rear wheels, and a pulley assembly comprising a first pulley and a second pulley in which each of the first pulley and the second pulley of the pulley assembly handles both the first cable portion and the second cable portion as the first cable portion and the second cable portion are conveyed rearward toward the steering disc to translate motion of the steering column pulley to the steering disc,
wherein the pulley assembly is configured such that the first pulley and the second pulley of the pulley assembly are disposed along a same side of the riding lawn care vehicle.

14. The cable system of claim 13, wherein the pulley assembly is configured such that the first and second cable portions each contact the first pulley and the second pulley on an opposite side of the first pulley and the second pulley relative to a longitudinal centerline of the riding lawn care vehicle, and wherein the first pulley comprises a front pulley receiving the first cable portion and the second cable portion extending from the steering column pulley, and the second pulley comprises a back pulley providing the first cable portion and the second cable portion toward the steering disc.

15. The cable system of claim 14, wherein the front pulley and the back pulley are each double pulleys comprising two independently rotatable wheels, and wherein one of the two independently rotatable wheels receives the first cable portion and the other of the two independently rotatable wheels receives the second cable portion.

16. The cable system of claim 14, wherein an axis of rotation of the front pulley, an axis of rotation of the back pulley, and an axis of rotation of the steering column pulley are each oriented differently to convey the first and second cable portions from the steering column pulley toward the steering disc while crossing the first and second cable portions such that the first cable portion is operably coupled to a first side of the steering column pulley that is opposite, relative to the centerline of the riding lawn care vehicle, of a first side of the steering disc to which the first cable portion is operably coupled, and the second cable portion is operably coupled to a second side of the steering column pulley that is opposite, relative to the centerline, of a second side of the steering disc to which the second cable portion is operably coupled.

17. The cable system of claim 13, wherein the steering column pulley comprises a gear operably coupled to the respective first ends of the first and second cable portions.

18. The cable system of claim 13, wherein the steering disc is rotatably disposed substantially between the rear wheels, and wherein a first tie rod operably couples the steering disc to a first one of the rear wheels and a second tie rod operably couples the steering disc to a second one of the rear wheels.

19. The cable system of claim 18, wherein the steering disc is mounted proximate to an axle mount fixed relative to a frame of the riding lawn care vehicle, the axle mount being disposed to extend between the rear wheels, wherein the axle mount comprises a first sleeve and a second sleeve disposed at opposite distal ends of the axle mount, the first and second sleeves receiving respective portions of a first axle rod and a second axle rod rotatably mounted therein.

20. A method of providing rear wheel steering for a riding lawn care vehicle, comprising:
providing a steering assembly comprising a steering wheel operably coupled to rear wheels of the riding lawn care vehicle via a cable system, wherein the cable system comprises a first cable portion and a second cable portion, wherein the first cable portion comprises a first end of the first cable portion and a second end of the first cable portion, and wherein the second cable portion comprises a first end of the second cable portion and a second end of the second cable portion;

operably coupling the respective first ends of the first and second cable portions to a steering column pulley, the steering column pulley being configured to pull a corresponding one of the first cable portion or the second cable portion based on a direction of rotation of the steering wheel;

operably coupling the respective second ends of the first and second cable portions to a steering disc, the steering disc being configured to provide translation of movement of the first cable portion and the second cable portion into corresponding movement of the rear wheels; and providing a pulley assembly comprising a first pulley and a second pulley in which each of the first pulley and the second pulley of the pulley assembly handles both the first cable portion and the second cable portion as the first cable portion and the second cable portion are conveyed rearward towards the steering disc to translate motion of the steering column pulley to the steering disc, the pulley assembly being configured such that the first pulley and the second pulley of the pulley assembly are disposed along a same side of the riding lawn care vehicle.

* * * * *